United States Patent [19]

Santos

[11] 4,422,614
[45] Dec. 27, 1983

[54] SUPPORT MEANS FOR A PLURALITY OF SOLAR PANELS

[75] Inventor: Gerard R. Santos, Levittown, Pa.

[73] Assignee: The Budd Company, Troy, Mich.

[21] Appl. No.: 296,797

[22] Filed: Aug. 27, 1981

[51] Int. Cl.³ .............................................. B60R 1/02
[52] U.S. Cl. ................................ 248/475 R; 126/438; 403/389; 350/296
[58] Field of Search .................. 126/424, 425, 438; 350/293, 296, 310, 292, 299, 288; 343/912; 248/475 R, 205.1, 214; 52/474, 479, 770, 773; 403/384, 386, 389

[56] References Cited
U.S. PATENT DOCUMENTS

| | | | |
|---|---|---|---|
| 4,135,493 | 1/1979 | Kennedy | 350/296 |
| 4,139,270 | 2/1979 | Dotson | 350/310 |
| 4,245,895 | 1/1981 | Wildenrotter | 126/438 |

Primary Examiner—Samuel Scott
Assistant Examiner—Noah Kamen
Attorney, Agent, or Firm—Edward M. Farrell; Herman Foster; Thomas I. Davenport

[57] ABSTRACT

A main tubular support structure extends along the length of a plurality of curved solar panels. Integral support sheet members are curved to receive the panels on one side. The opposite side of the sheet members include projecting sections welded to the tubular structure.

3 Claims, 4 Drawing Figures

SUPPORT MEANS FOR A PLURALITY OF SOLAR PANELS

BACKGROUND OF THE INVENTION

Utilizing solar energy to produce heat is well known. Systems have been used with a large number of aligned curved reflectors to receive energy from the sun to focus and reflect rays to a receiver element. The receiver element may comprise a conduit through which circulating water or oil is passed and heated by the reflected sun rays from the reflectors.

Because of the relatively high use contemplated for solar energy systems, it is desirable to be able to build such systems with minimum costs. Reducing such cost generally involves utilizing a minimum number of parts and assembling such parts with a minimum amount of labor. It is desirable that the parts be made by conventional techniques and be capable of mass production to cut overall costs.

While the costs of producing solar systems are of great importance, it is equally important that the efficiency of the systems is not impaired. For example, the parts used must be capable of long lives and the structure for holding and rotating the array of solar panels must be relatively strong and capable of withstanding adverse weather conditions over long periods of time.

The present invention relates to a structure for supporting a plurality of aligned solar panels. One such structure is described in a copending patent application entitled "A Support Structure for Supporting a Plurality of Aligned Solar Panels", Ser. No. 236,862, filed Feb. 23, 1981, assigned to the same assignee as the present invention. While the structure described in this patent application, is extremely strong and satisfactory, the number of parts involved and labor involved in assembly tends to be higher than that involved in the subject invention.

Another copending application entitled "Panel for a Solar Heating System", Ser. No. 185,360, filed Sept. 8, 1980, also assigned to the same assignee as the present invention, describes a type of solar panel which may be used with the present invention.

OBJECTS OF THE INVENTION

It is an object of this invention to provide an improved means for supporting a plurality of solar panels utilizing a minimum number of parts.

It is a further object of this invention to provide improved means for connecting a solar panel to a main support structure.

It is still a further object of this invention to provide an improved means for supporting and rotating a plurality of solar panels wherein the costs of the parts involved and assembly are minimized.

BRIEF SUMMARY OF THE INVENTION

In accordance with the present invention, support means for holding a plurality of curved aligned solar panels include a main metal tubular support structure extending along the length of the panels to be supported. A plurality of integral metal sheet members are formed to receive the panels thereon by suitable mechanical attachment means. A pair of projecting sections extend from each of the support members and spaced to permit them to be welded to the tubular structure. Suitable means support the ends of the tubular structure and permit rotation thereof.

Other objects and advantages of the present invention will be apparent and suggest themselves to those skilled in the art, from a reading of the following specification and claims taken in conjunction with the accompanying drawings.

DESCRIPTION OF THE INVENTION

Figure 1:
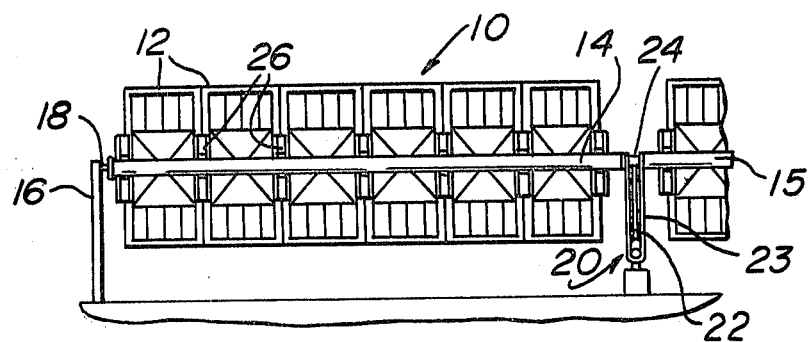
FIG. 1 illustrates an array of solar panels supported on a strong back and utilizing support means in accordance with the present invention.

Referring to FIG. 1, a solar system 10 comprises a plurality of aligned curved solar panels 12 secured to tubular support structure 14. The tubular support structure 14 is connected to posts or pedestals 16 and 22 which may be connected to the ends of each array of panels. The ends of the tubular support structure 14 may include end connecting members including a shaft 18 which is disposed within suitable mechanisms associated with the end pedestals to permit rotation therein. The connecting members are more clearly illustrated in FIG. 3. The opposite end of the array illustrated would be connected in a similar manner. Means for rotating the tubular structure 14 may include a pulley arrangement 20. Joining sections of the array illustrated may be supported by the post 22. The pulley mechanism 20 may be driven by conventional means and may include a belt 23 connected to a drive shaft 24. The drive shaft element 24 may be connected between the tubular support structure 14 and the next adjacent the tubular support structure 15.

The solar system 10 may be rotated by any conventional means and preferably would be free to rotate about 360°. The various mechanisms for connecting support structures to end posts and the means rotating the support structures may be found in the first of the above-mentioned copending patent applications. Because the present invention is primarily directed to the means for connecting the solar panels 12 to a tubular structure 14, various other details relating to the system will not be shown or described in further detail. The solar panels 12 may be of the type described in connection with the second of the above-mentioned copending patent applications. The panels 12 may take various forms and are not directed to the present invention.

Figure 2:
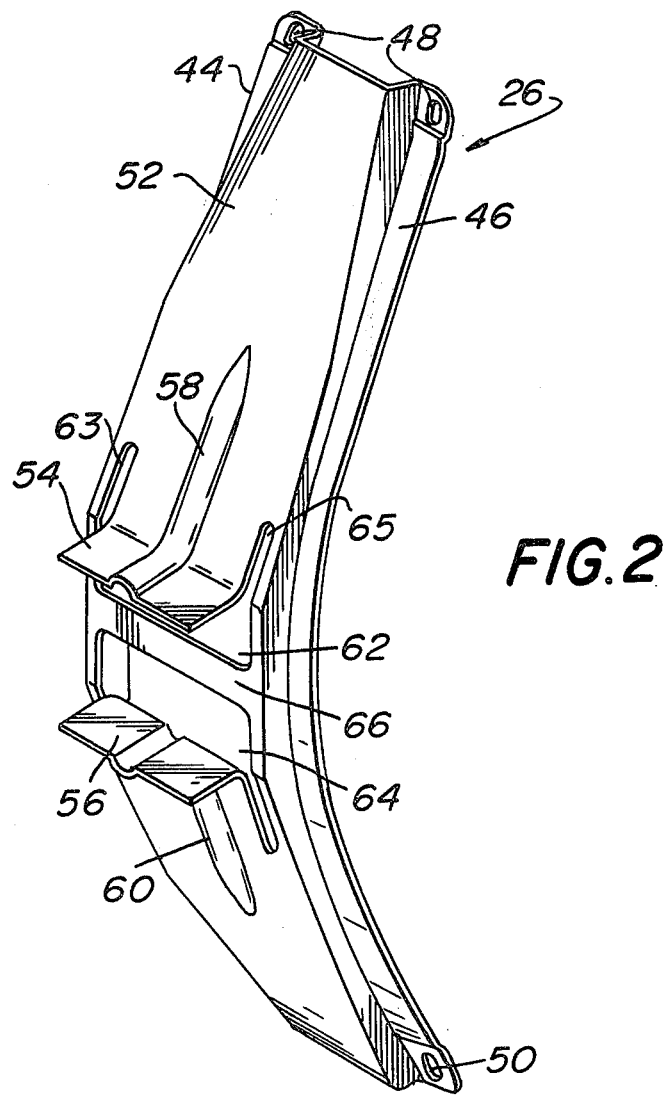
FIG. 2 is an isometric view of one of the support members for supporting the solar panels, in accordance with the present invention.
Figure 3:
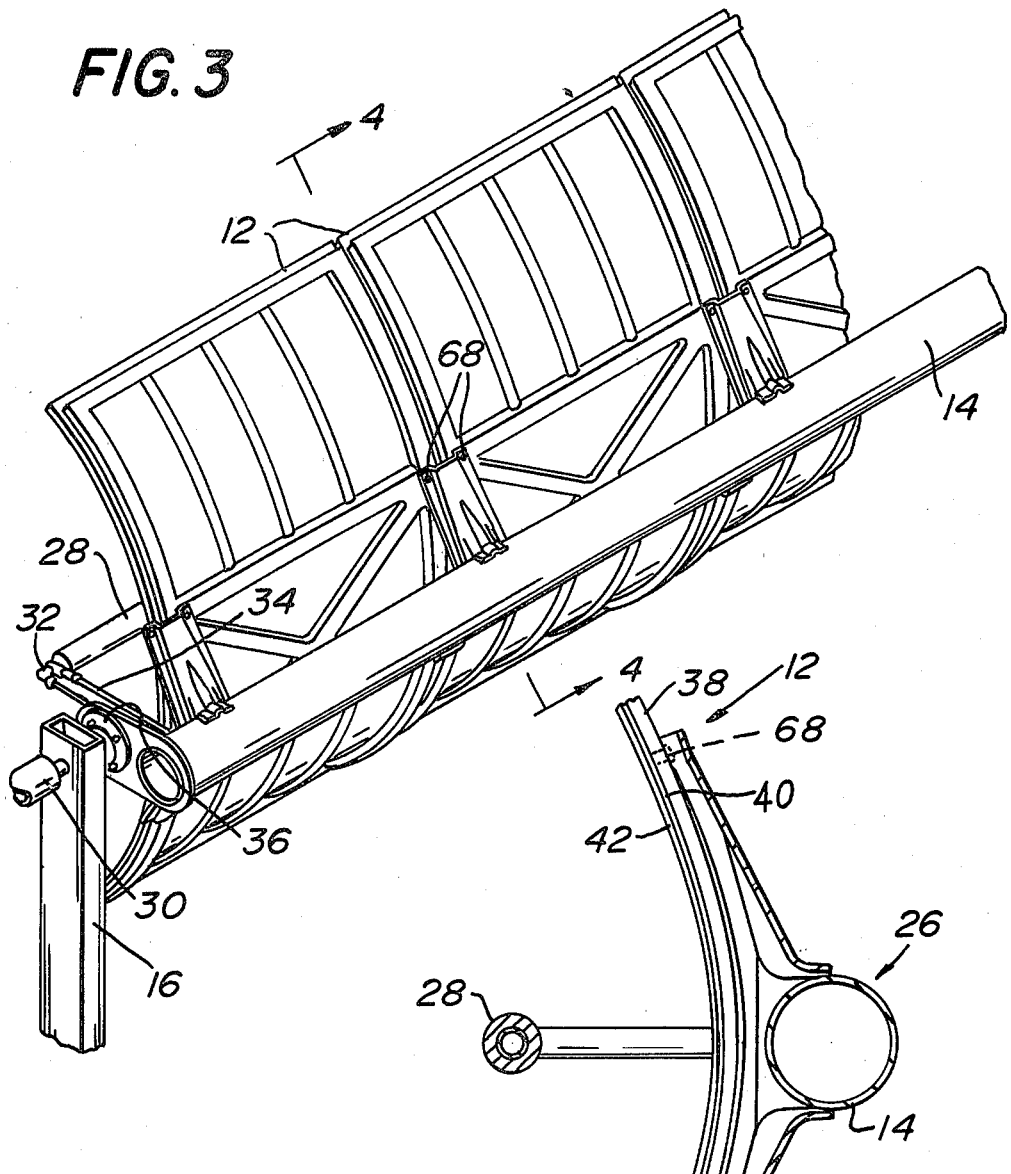
FIG. 3 is an isometric enlarged view of a portion of FIG. 1, illustrating the details involving the connections of the support members to the solar panels.
Figure 4:
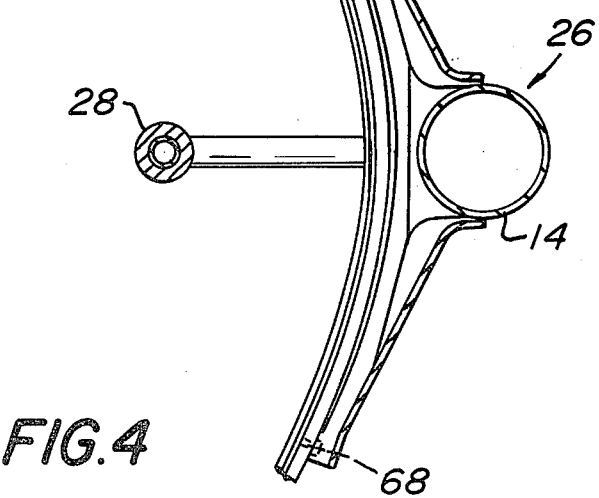
FIG. 4 is a cross-sectional view taken along lines 4—4 of FIG. 3.

Referring to FIGS. 2, 3 and 4, along with FIG. 1, the panels 12 are connected to the tubular structure 14 to support members 26. One such support member 26 is illustrated in detail in FIG. 2.

Referring to FIGS. 2, 3 and 4, FIG. 3 illustrates additional details relating to a solar system which are not particularly directed to the present invention. The solar panels 12, which include mirror reflective front surfaces, are curved as to receive the direct rays of the sun and focus or direct the reflected rays to a receiver or collector 28 (FIG. 3). Oil to be heated is directed from a liquid reservoir through a hose 30 through suitable fittings 32 to the collector 28. The oil or water is circulated so that it passes through the collector or receiver 28 and passes to a storage system where the heated liquid may be stored and utilized.

The collector 28 is supported in front of the reflecting portions of the panels 12 by means of rods 34 which connect the receiver 28 to the tubular structure 14. The various means for circulating the liquid to the receiver is not directly related to the present invention.

In FIG. 3, the structure 14 is connected by connecting member 36 which is connected to the shaft 18 (FIG. 1) and rotates in the post 16. In FIG. 4, the panel 12 comprises a main rear panelled section 38, an intermediate panel 40 and a reflecting surface, such as a mirror 42. As mentioned, this type of panel is described in detail in the aforementioned second pending application.

Referring to FIG. 2, the support member 26 comprises an elongated metal sheet. In the forming process the support member 26 is first punched with the openings required and sections are suitably bent with the main shape formed being the same shape as the panels 12 to be held.

The metal sheet or support member 26 includes a pair of longitudinally extending edges 44 and 46. These edges provide rigidity and are bolted to the solar panels by bolts passing through top apertures 48 and bottom apertures 50. The center section 52 extends inwardly away from the edges 44 and 46 to provide rib stiffness. The center portion 52 includes protruding rib sections 58 and 60 for added strength for protruding sections 58 and 60.

When the protruding sections 54 and 56 are formed, openings 62 and 64 are also formed. The openings 62 and 64 are spaced with respect to each other with a section 66 remaining part of the main structural member to provide strength. This section may also be used, if desired, to bolt the member 26 to the tubular structure 14. Slit openings, such as 63 and 65, are provided in the top and bottom portions of member 26 to prevent stress areas which would tend to be present in the metal if straight cuts were made.

As illustrated in FIG. 3, the projecting portions 54 and 56 are welded to the support tubular structure 14. As illustrated in FIGS. 3 and 4, the front portion of the support member 26 is shaped to the same curve as the solar panels 12. The support members 26 are adapted to be connected to the rear areas of the panels 12 by suitable connecting means which may be screws 68. Nuts and bolts may also be used.

Referring to FIG. 3, it is noted that each of the support members 26, except the two end ones, are adapted to receive two adjacent panels 12. One longitudinal edge, i.e., 44 or 46 (FIG. 2), of the support member 28 is disposed to be connected to one panel and the opposite edge of the support member is disposed to be connected to the adjacent panel. At the end of each array, the support member 26 is connected to only a single end panel 12.

The use of the support members 26 in the form illustrated greatly facilitates the attachment of the panel to the main tubular support 14. The support members 26 may be formed by simple conventional techniques involving punching and forming a sheet of elongated metal. Because the support members 26 are properly formed, precise positioning of the panels 12 with respect to the support structure 14 is predetermined by the protruding sections connected to the support structure 14. The precise positions of the apertures permit relatively easy and quick attachment of the members 26 to the solar panels.

Use of the support members 26 of the type illustrated greatly facilitates the assembly of the solar system 10. Conventional parts are used which are assembled by well known mass production techniques which permit effective welding and mechanical fastening.

What is claimed is:
1. Support means for holding a plurality of curved solar panels comprising:
   (a) a main metal tubular support structure extending along the length of the solar panels to be supported;
   (b) a plurality of support members for receiving said plurality of solar panels thereon connected to said main tubular support structure;
   (c) each of said support members comprising an elongated integral metal sheet curved to receive said solar panels on one side and including projecting sections on the opposite side welded to said tubular support structure;
   (c) each of said support members being adapted to receive and hold two adjacent solar panels and including longitudinally disposed edges including a plurality of apertures therein to permit fastening means to be connected therethrough to hold said solar panels;
   (e) each of said support members further including a solid section between said protruding sections with each of said protruding sections including a centrally disposed indent portion to add strength thereto; and
   (f) each of said support members still further including a pair of apertures at opposite ends thereof with said support members overlapping adjacent solar panels so that one aperture of each said pair is aligned with one solar panel.
2. Support means as set forth in claim 1 wherein tubular support structure is supported at two ends and include means for rotating said tubular support structure.
3. Support means as set forth in claim 2 wherein said tubular support structure is free to rotate about 360°.

* * * * *